United States Patent
Toth

(10) Patent No.: US 7,593,212 B1
(45) Date of Patent: Sep. 22, 2009

(54) RELAY DRIVE MATRIX

(75) Inventor: Bartholomew L. Toth, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 29 days.

(21) Appl. No.: 12/061,948

(22) Filed: Apr. 3, 2008

(51) Int. Cl.
*H01H 47/00* (2006.01)

(52) U.S. Cl. ............................ 361/160; 361/153

(58) Field of Classification Search ........... 361/160, 361/153
See application file for complete search history.

(56) References Cited

U.S. PATENT DOCUMENTS

| | | | | |
|---|---|---|---|---|
| 4,631,627 A | * | 12/1986 | Morgan | 361/153 |
| 4,833,708 A | | 5/1989 | Goodrich | 379/329 |
| 5,612,580 A | * | 3/1997 | Janonis et al. | 307/64 |
| 5,712,608 A | | 1/1998 | Shimomura et al. | 335/60 |
| 6,111,373 A | * | 8/2000 | Ohashi | 318/265 |
| 6,119,950 A | * | 9/2000 | Albanello et al. | 236/46 R |
| 6,738,250 B2 | * | 5/2004 | Joseph et al. | 361/144 |

* cited by examiner

*Primary Examiner*—Stephen W Jackson
*Assistant Examiner*—Angela Brooks
(74) *Attorney, Agent, or Firm*—Harness, Dickey & Pierce, P.L.C.

(57) ABSTRACT

A microprocessor-based control system is provided that comprises a plurality of latching relays, at least some of which may be connected in parallel. A momentary application of voltage of a first polarity or a second polarity to the coil causes the latching relay contacts to switch and remain in an open or closed state respectively. An individual relay driver circuit is provided for a corresponding latching relay or set of latching relays, and has a first and second switch that respectively apply a voltage or a ground connection to a first end of each coil corresponding to the individual relay driver. The control system includes a common relay driver connected to at least one of the latching relays for each relay drive circuit, and has a first and second switch that respectively apply a voltage or a ground connection to the second end of the latching relay coils connected to the common relay driver circuit.

20 Claims, 8 Drawing Sheets

RELAY DRIVE MATRIX

FIELD

The present disclosure relates to a thermostat with one or more relays for controlling activation of one or more HVAC loads, and to a method of controlling one or more relays.

BACKGROUND

The statements in this section merely provide background information related to the present disclosure and may not constitute prior art.

Thermostats used for controlling HVAC systems typically control relays in the HVAC systems to operate heating loads and cooling loads without consideration for the complexity of circuitry for controlling the relays. With the growing complexity of HVAC systems increasing the number of loads, prior art thermostats are unable to accommodate a plurality of relays for activating various components of the heating or cooling system, or require more costly microprocessors to accommodate the greater functionality.

SUMMARY

In one aspect of the present invention, various embodiments of a thermostat are provided with a control system for a plurality of relays. In the various embodiments, a relay control system is provided that comprises a plurality of latching relays, at least some of which may be connected in parallel. A momentary application of voltage of a first polarity or a second polarity to the coil causes the latching relay contacts to switch and remain in an open or closed state respectively. An individual relay driver circuit is provided for a corresponding latching relay or set of latching relays, and has a first and second switch that respectively apply a voltage or a ground connection to a first end of each coil corresponding to the individual relay driver. The control system includes a common relay driver connected to at least one of the latching relays for each relay drive circuit, and has a first and second switch that respectively apply a voltage or a ground connection to the second end of the latching relay coils connected to the common relay driver circuit.

The microprocessor is configured to momentarily apply a positive voltage to at least one relay driver output pin to cause the first switch of at least one relay driver circuit to apply a voltage of a first polarity to a first end of the coils of at least one paired latching relay set, and to momentarily apply a ground connection to at least one common relay driver output pin to cause the second switch of at least one common relay driver circuit to apply a ground connection to the second end of the coils of the individual latching relays common to the at least one common relay driver circuit. The microprocessor thereby momentarily applies a voltage of a first polarity to at least one single coil for causing the contacts of at least one latching relay to close and remain set in the closed position, for establishing an electrical connection to a load.

The microprocessor is also configured to momentarily apply a ground connection to at least one relay driver output pin to cause the second switch of at least one relay driver circuit to apply a ground connection to the first ends of the coils of at least one paired latching relay set, and to momentarily apply a positive voltage to at least one common relay driver output pin to cause the first switch of at least one common relay driver circuit to apply a voltage of a second polarity to the second end of the coils of the latching relays common to the at least one common relay driver circuit. The microprocessor thereby momentarily applies a voltage of a second polarity to at least one single coil for causing the contacts of at least one latching relay to reset and remain open, for breaking an electrical connection to a load.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
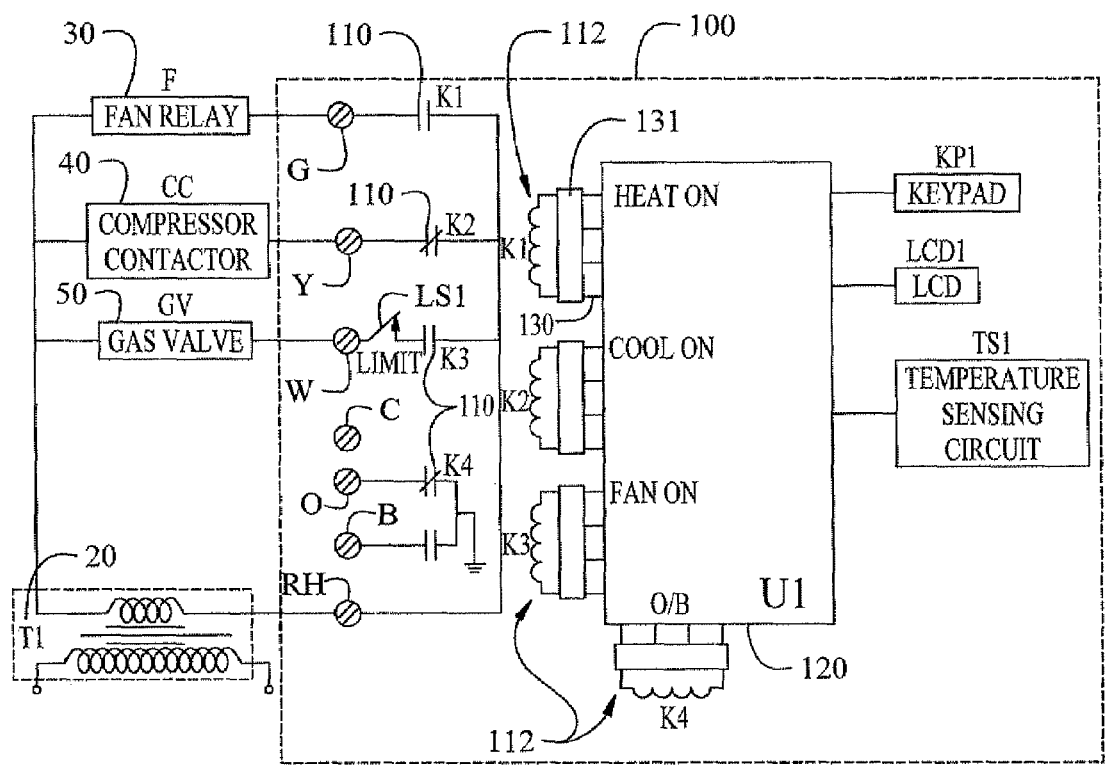
FIG. 1 is a simplified block diagram of a part of an HVAC system controlled by a thermostat in accordance with the principles of the present disclosure.

The following description is merely exemplary in nature and is not intended to limit the present disclosure, application, or uses. It should be understood that throughout the drawings, corresponding reference numerals indicate like or corresponding parts and features.

In the description and claims set forth herein, the term HVAC system can refer to a system or unit for cooling or for heating only. A "load" is used to refer to a device such as a gas valve, a compressor contactor, or a relay controlling a fan, an electric heater, or to any other device or apparatus controlled by the thermostat for effecting a temperature change or to a selected one of a combination of such devices present in an HVAC system, insofar as such devices in a system are controlled by the thermostat. Also, where a device, circuit, or input is said to be responsive to a particular signal, whether a voltage signal or a current signal, unless otherwise noted, it is understood that one skilled in the art would understand that such signals may, as a design choice, be transformed or conditioned, or other equivalent signals generated that operate and are used as a functional equivalent to the particular signal named. The use of such transformed, conditioned, or equivalent signals should be understood as being within the scope and spirit of the invention and also be considered, where applicable and appropriate, as falling within the scope of the claims, either literally or by equivalence.

FIG. 1 is a simplified block diagram of part of an HVAC system controlled by the thermostat 100 of the present invention, showing electrical connection of portions of the thermostat with the HVAC unit. Power for the thermostat 100 is provided from a 120 VAC source through a system power transformer 20, which typically provides a secondary voltage of 24 VAC. The power supply voltages represent a typical design choice made by designers of HVAC systems. The practice of the invention does not depend upon this voltage choice, however, and other voltages could be accommodated if necessary.

The thermostat 100 is provided with conventional thermostat peripherals, including keys KP1 for the input of commands, an LCD display LCD1 for displaying the current status of the thermostat, and a temperature sensing circuit TS1. A microprocessor U1 (120) is configured to selectively provide high or low output signals, such as 5 volts dc or a ground signal, via output pins. The output signals operate switches or transistors, which in turn open or close the contacts of a plurality of latching relays K1, K2, K3 and K4. These are latching relays for connecting 24 VAC at terminal RH to various HVAC loads, such as a fan relay (G terminal) gas valve or furnace relay (W), or a compressor contactor (Y). Operation of the thermostat of FIG. 1 is conventional, in that activation of fan (G), heating system (W), and compressor contactor (Y) is controlled in accordance with a sensed temperature and the controller settings. It will be appreciated that not all of the terminal connections are necessary for all thermostats, nor are all required to be used in the practice of the invention.

Figure 2:
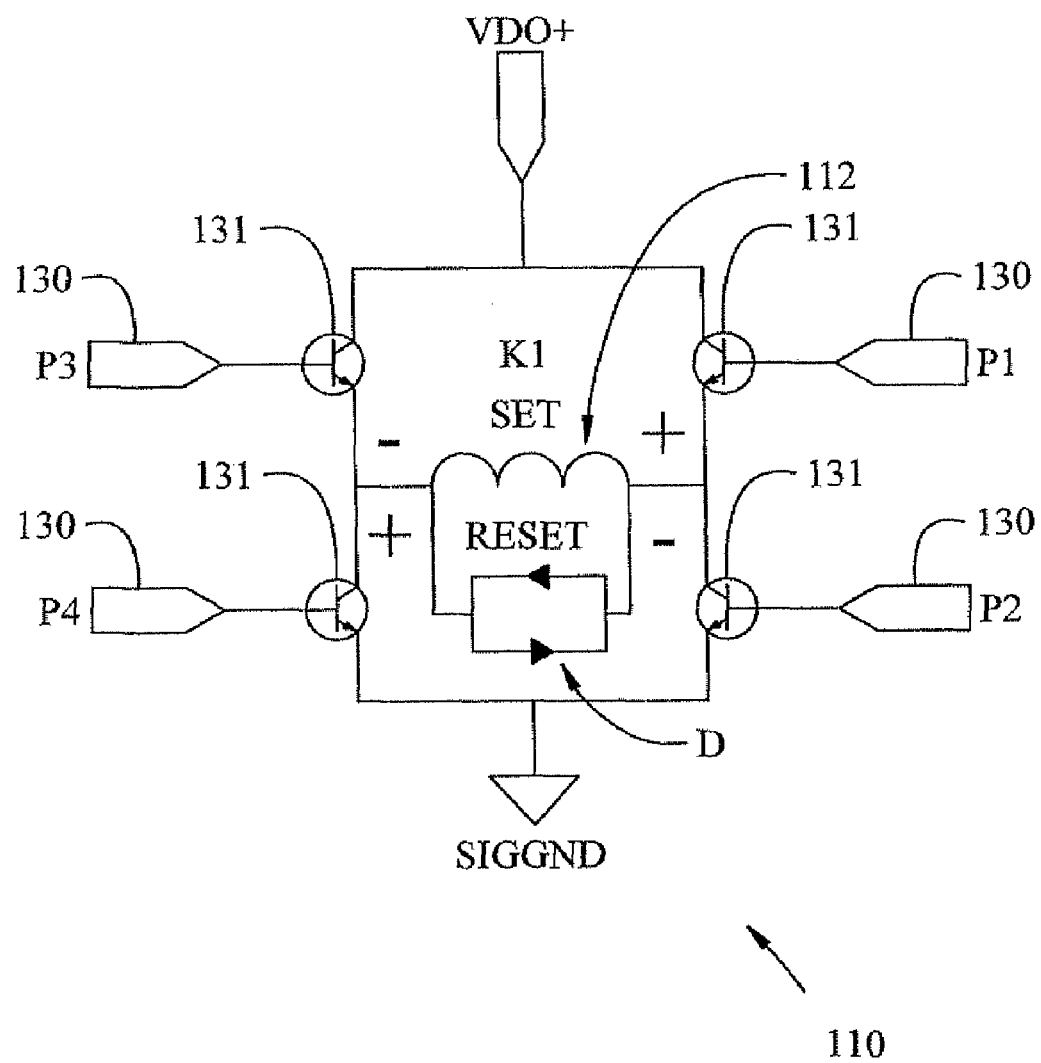
FIG. 2 is a simplified schematic diagram of an input circuit for controlling a latching relay having a single coil.

The microprocessor is configured or programmed to operate relay driver switches 131 for controlling the latching relay's single coil, which switches are typically arranged as shown in FIG. 2. The circuit in FIG. 2 shows a latching relay K1 having a single coil 112 for opening and closing the latching relay's contacts (see 110 in FIG. 1). Application of a voltage of a first polarity (indicated by the − and +) to the single coil 112 causes the contacts to be set to a closed-contact position for establishing electrical connection to a load. Application of a voltage of a second polarity (indicated by the + and −) to the single coil 112 causes the contacts to be set to an open contact position for breaking an electrical connection to a load. Thus, the single-coil latching relay 110 in FIG. 2 requires four (4) switches 131 to be able to apply first and second voltages of opposite polarities, which would require four (4) output pins 130 from a microprocessor. Accordingly, a plurality of latching relays may require a costly microprocessor having a significant number of output pins. In view of the above, the following thermostat embodiments demonstrate the advantages of the principles of the present invention, which may be incorporated into a general purpose apparatus having load control functions, as well as thermostats designed to control a variety of systems.

Returning to FIG. 1, operation of a thermostat is described for illustration purposes only, to explain the function of the latching relays in controlling one or more HVAC loads. A request for heating or cooling may be established when an AC voltage is connected to the appropriate terminal G, Y, or W. This is achieved by operating latching relays K1, K2 and K3 to close a set of contacts for connecting an AC voltage at R with teerminals G, Y and W. Typically, a latching relay having a single coil 112 is "SET" when the single coil 112 is energized by a pulse of DC voltage of a first polarity lasting at least about 8 milliseconds, for example. If heating is to be initiated, K1 is SET by energizing the relay coil for about 8 milliseconds, for example, to close the contacts of K1 for switching voltage to the W terminal to activate a gas valve or furnace relay. The microprocessor 120 may initiate cooling by energizing the coil to close the contacts of K2 for switching voltage to the compressor terminal Y, to activate a compressor contactor and establish cooling operation. A fan relay F may also conventionally controlled by additional relay K3. When either the compressor or gas valve is on, the fan is typically turned on. The fan may be turned on by the thermostat when the compressor is turned on by the thermostat, for example. The fan may also be turned on by the furnace (such as in the case of a gas-fired heater). It will be understood that some variation in the circuitry described thus far may occur in any given system, and that accommodation of such variation may require obvious design choices to be made to the embodiment described here in order to practice the invention. It should be noted with respect to the latching relays, that once the latching relay is pulsed, it stays in either the "set" position of the relay or "reset" position of the relay until it is pulsed by a voltage of an opposite polarity. While the relay remains in either the SET or RESET state, no current flows to the latching relay coil between application of the pulses.

Figure 3:
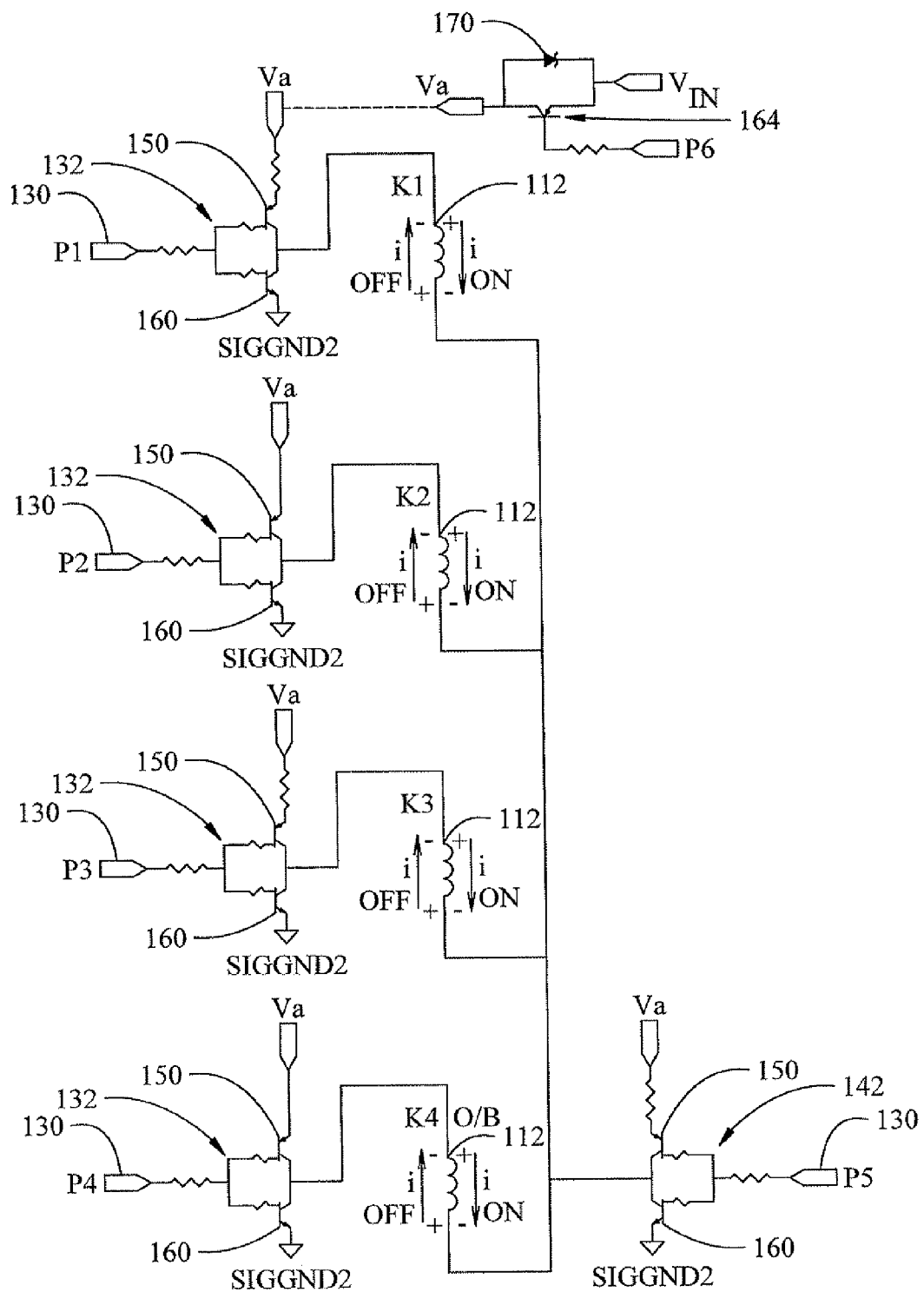
FIG. 3 is a schematic diagram of one preferred embodiment of a control circuit for a plurality of single-coil latching relays in accordance with the principles of the present disclosure.

In a first preferred embodiment of a thermostat 100, the thermostat includes a plurality of latching relays having contacts for connecting one or more loads to a power source (such as a 24 VAC transformer). The plurality of latching relays each have a single coil 112 with first and second connection ends, as shown in FIG. 3. The latching relay's single coil 112 is configured to open and close a set of contacts in response to a voltage applied to the coil. A voltage of a first polarity that is momentarily applied to the single coil 112 causes the contacts to close and remain set in the closed position, even after the voltage is removed from the coil, to thereby establish an electrical connection to a load. A voltage of a second opposite polarity that is momentarily applied to the single coil 112 causes the contacts to open and remain open in a reset position, even after the voltage is removed from the coil, to thereby break an electrical connection to a load.

In the first embodiment shown in FIG. 3, the latching relay circuit further includes a plurality of relay drivers 132 for applying an electrical signal to a latching relay coil 112 to switch the latching relay. Each individual relay driver circuit 132 corresponds to an individual latching relay/coil. In this configuration, each individual relay driver circuit 132 has a single input in communication with an associated microprocessor output pin. The individual relay driver circuit 132 has a single input (P1) that is connected in parallel to first and second switches 150, 160, which both provide for electrical connection of a positive voltage or a ground signal to the first end of the single coil 112 of the individual latching relay. When a ground connection is established at the input (P1) to the second switch 160, the second switch 160 is configured to establish a ground connection with the first end of the individual latching relay coil 112. When a positive voltage is applied to the single input (P1) for the first switch 150, the first switch 150 is configured to connect the first end of the individual latching relay coil 112 to the output of a switched voltage source Va. It should be noted that in this first embodiment, the voltage Va is not applied to the single coil 112 until the switch 164 is switched to apply the voltage Va to the single coil 112.

In the first embodiment in FIG. 3, the latching relay circuit further includes a common relay driver circuit 142. The common relay driver circuit 142 has a common input (P5) connected in parallel to first and second switches 150, 160, which both provide for electrical connection of a positive voltage or a ground signal to the second ends of the single coils 112 in each of the plurality of latching relays. When a ground connection is established at the input (P1) to the second switch 160, the second switch 160 is configured to establish a ground connection with the second ends of the individual latching relay coils 112. When a positive voltage is applied to the single input (P5) for the first switch 150 (by microprocessor 120 to common input P5), the first switch 150 is configured to connect the second ends of the individual latching relay coils 112 to the output of the switched voltage source Va. It should be noted that in this first embodiment, the voltage Va is not applied to the single coil 112 until the switch 164 is switched to apply the voltage Va to the single coil 112.

The thermostat 100 includes a microprocessor 120, which has a plurality of output pins 130 that are connected to the latching relay circuit as shown in FIG. 3. The microprocessor is configured to operate the relay driver circuits and common driver circuit to select, or set the positions of the latching relays. As shown in FIG. 3, the microprocessor has a common output pin 140 (P5) and a plurality of relay driver output pins (P1-P4) corresponding to the plurality of relay driver circuits 132. The common output pin (P5) is connected to the input of the common relay driver circuit 142, and each relay driver output pin 130 is connected to the input of each relay driver circuit 132. The microprocessor also controls a switch 164 for momentarily switching the voltage source Va to the selected relay coils.

The microprocessor is configured to apply a ground connection to the common output pin (P5) to cause the second switch 160 of the common relay driver circuit 142 to establish a ground connection with the second ends of the single coils 112. The microprocessor is also configured to concurrently apply a positive voltage to at least one of the plurality of relay driver output pins (P1-P4), to cause the first switch 150 of at least one relay driver circuit 132 to connect the switched voltage source Va to the first end of the single coil 112 of at least one latching relay. For example, once the microprocessor has output a positive voltage at input (P1) to the first switch 150 of a relay driver 132, and a ground connection at input (P5) for the second switch 160 of the common relay driver 142, the microprocessor may then output a signal to switch 164 to momentarily apply the voltage source Va to the first side of the single coil 112, where the second side of the single coil 112 is connected to ground. This applies a voltage of a first polarity to the single-coil 112 for causing the contacts of a latching relay to close and remain SET in the closed position, to thereby establish an electrical connection to at least one load.

The microprocessor is further configured to apply a ground connection to at least one of the plurality of the relay driver output pins (P1-P4) to cause the second switch 160 of at least one relay driver circuit 132 to establish a ground connection with the first end of at least one single coil 112. The microprocessor is also configured to concurrently apply the a positive voltage to the common relay driver pin (P5) to cause the first switch 150 of the common relay driver circuit 142 to connect the switched voltage source Va to the second end of the single coils 112. For example, once the microprocessor has output a positive voltage at input (P5) to the first switch 150 of a common driver 132, and a ground connection at one or more inputs P1-P4 for the second switch 160 of one or more relay drivers 142, the microprocessor may then output a signal to switch 164 to momentarily apply the voltage source Va to the second side of the single coil 112, where the first side of the single coil 112 is connected to ground. This applies a voltage of a second polarity to at least one single-coil 112 for causing the contacts of at least one latching relay to open and remain RESET in the open position, to thereby break an electrical connection to at least one load.

Accordingly, the microprocessor is configured to output signals to the common driver pin and the individual relay driver pins for selecting at least one latching relay single-coil to actuate, and further configured to momentarily switch a switch 164 to apply a voltage Va in either a first polarity or a second polarity to the at least one latching relay single coil. This allows for pulsing at least one single coil (for at least 8 milliseconds, for example), to set the contacts of at least one latching relay to a closed state or and open state, after which pulse the contacts remain in the closed or open state.

In accordance with another aspect of the invention, a diode 170 may be additionally provided to supply an EMF to the one or more latching relay coils. A fly-back diode is typically utilized in connection with a relay coil. However, at least two diodes would typically be required for the single coil of a latching relay (as shown in FIG. 2), to accommodate the application of voltage in two opposing polarities. Thus, the single latching relay in FIG. 2 required two fly-back diodes for a single coil, which could lead to considerable cost where multiple relays are utilized. In the thermostat 100 including the latching relay circuit shown in FIG. 3, a switch 164 is provided for switching a voltage source Va to each of the selected latching relay coils, and further includes a fly back diode 170 connected in parallel to the switch 164. When the microprocessor signals the switch 164 to apply the voltage source Va to one or more selected latching relay coils, and then switches off switch 164, the flyback diode is in connection with each of the latching relay single-coils selected by the individual relay driver circuits controlled by the microprocessor. Thus, the microprocessor is configured to output signals to the common driver pin and the individual relay driver pins for selecting at least one latching relay single-coil to actuate, via the switched voltage Va. After switch 164 switches off the voltage Va applied through each switch 150 selected by the microprocessor, the single fly-back diode 170 in parallel with switch 164 remains in electrical connection, through each switch 150 selected by the microprocessor, with each selected single coil 112. This single fly-back diode 170 may accordingly be connected in parallel to one or more single coils selected by the microprocessor. In this manner, a single fly-back diode may be electrically connected to a number of pulsed latching relay coils, to thereby reduce the requirement of two diodes per single coil as in FIG. 2, to only a single diode for a plurality of single coils.

Figure 4:
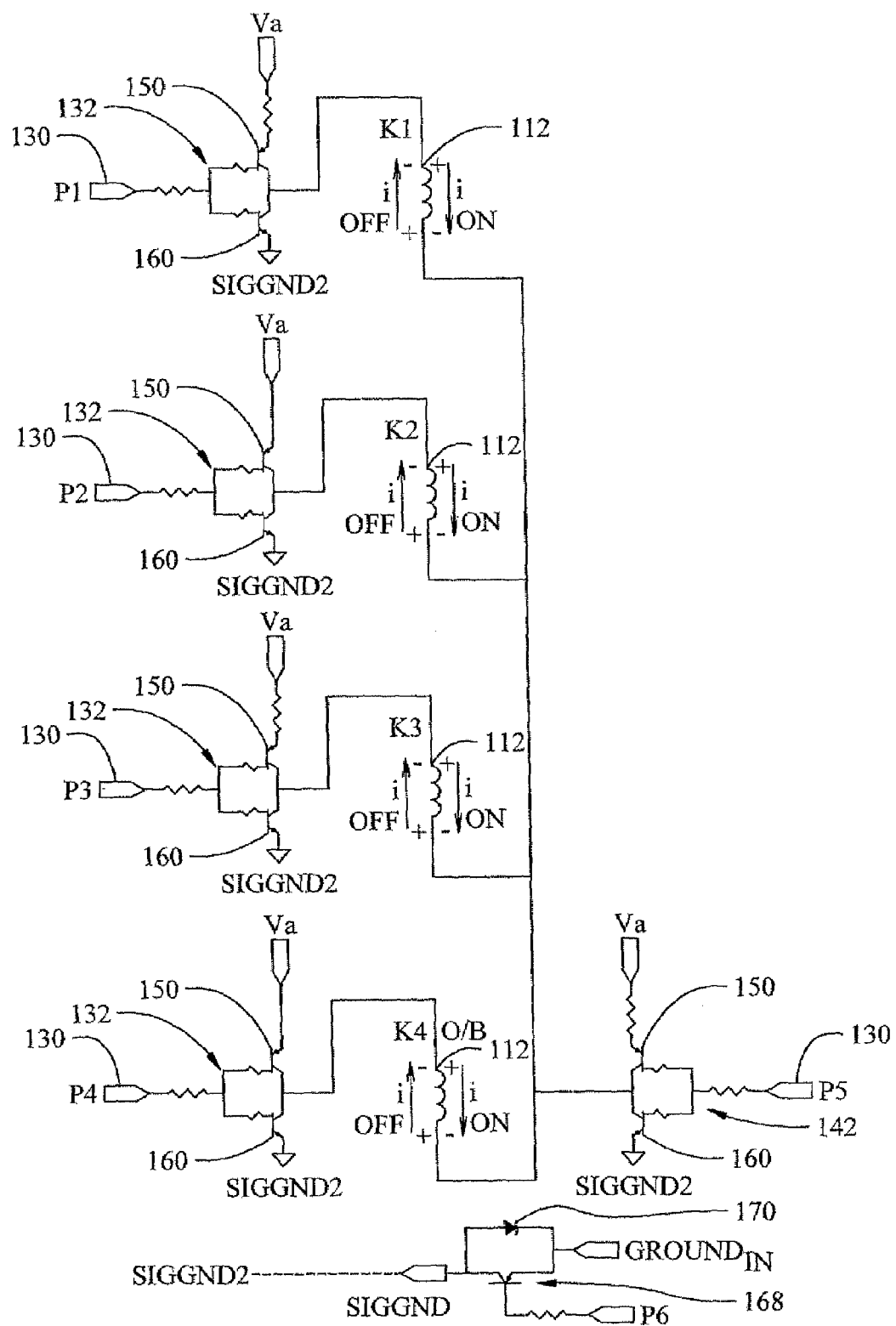
FIG. 4 is a schematic diagram of an alternate construction of the embodiment of FIG. 3, in accordance with the principles of the present disclosure.

In an alternate construction of the first embodiment shown in FIG. 4, the switched voltage source Va is interchangeably replaced by a switched signal ground source 168, where the voltage Va is not applied to any single coil until the microprocessor 120 switches the switch 168 to connect the signal ground to at least one single coil. It should be understood that this alternate construction operates in essentially an equivalent manner as the first embodiment.

In the various embodiments, a thermostat may be provided that comprises a plurality of single-coil latching relays, a microprocessor having a plurality of relay driver output pins corresponding to the plurality of single-coil latching relays, and at least one common driver output pin connected in common to the plurality of single coil latching relays. In a second embodiment of a latching relay circuit shown in FIG. 5, the of a latching relay circuit does not include the first embodiment's switch for switching the voltage source Va (or the signal ground) to the single coils, but rather concurrently controls the relay driver and common driver circuits to momentarily apply a voltage to the single coil.

Figure 5:
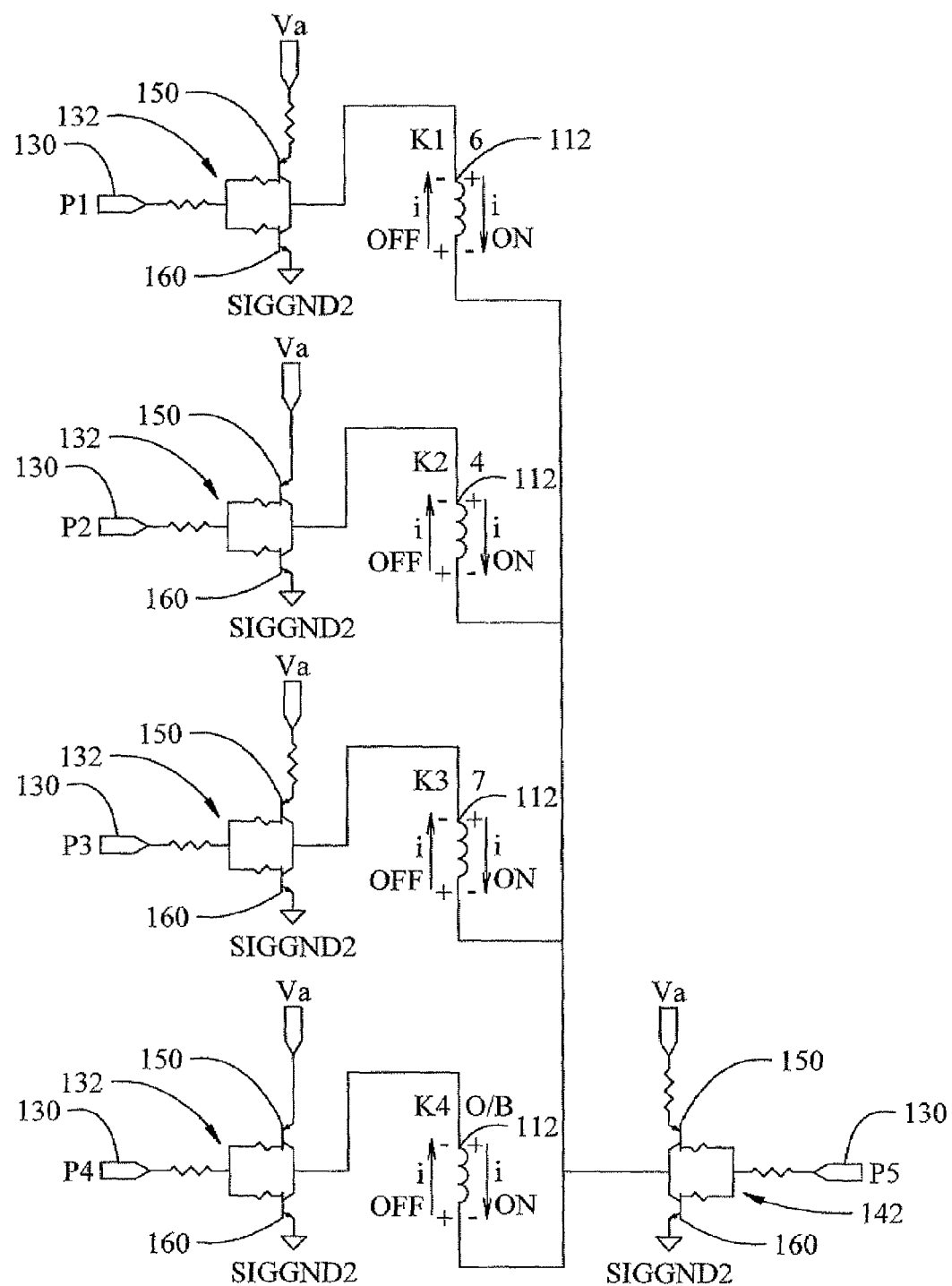
FIG. 5 is a schematic diagram of a second embodiment of a control circuit for a plurality of single-coil latching relays in accordance with the principles of the present disclosure.

A thermostat 100 having this second embodiment of a latching relay circuit includes a plurality of latching relays/contacts 110 for connecting one or more loads to a power source, each latching relay having a single coil 112 with first and second ends, as shown in FIG. 5. The latching relay's single coil 112 is configured to open and close a set of contacts in response to an applied voltage, where a voltage of a first polarity that is momentarily applied to the single coil 112 causes the contacts to close and remain set in the closed position after said voltage is removed to thereby establish an electrical connection to a load. A voltage of a second opposite polarity that is momentarily applied to the single coil 112 causes the contacts to open and remain open in a reset position to thereby break an electrical connection to a load.

Figure 6:
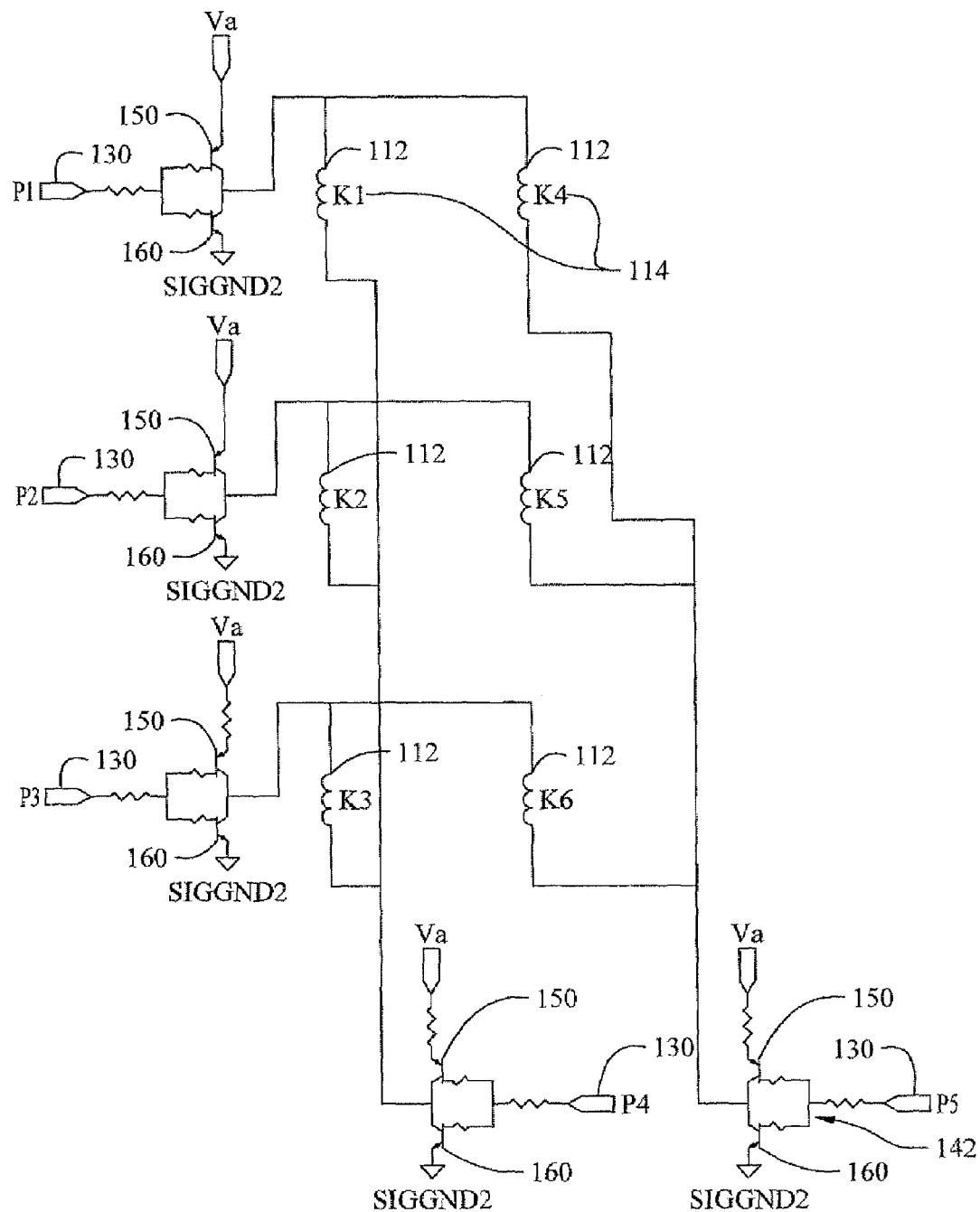
FIG. 6 is a schematic diagram of a third embodiment of a control circuit for a plurality of paired single-coil latching relays in accordance with the principles of the present disclosure.

Alternatively, a thermostat 100 according to the principles of the present application may have more than one latching relay connected in common or in pairs 114, as shown in FIG. 6. In this embodiment, the latching relay circuit includes a plurality of paired latching relays connected in parallel, each latching relay having a single coil 112 configured to open and close a set of contacts. The momentarily application of a voltage of a first polarity or a voltage of a second polarity to the single coil 112 causes the contacts to remain in an open state or a closed state respectively, for establishing or breaking an electrical connection with a load.

The second embodiment of a latching relay circuit further includes a plurality of relay drivers 132 for applying an electrical signal to a latching relay coil 112 to switch the latching relay. In some embodiments, the latching relay circuit may have one individual relay driver 132 associated with a single latching relay coil 112. For example, one embodiment shown in FIG. 5 preferably has a plurality of relay driver circuits 132, where each individual relay driver circuit 132 corresponding to an individual latching relay/coil. In this situation, the individual relay driver circuit 132 has a single input connected in parallel to first and second switches 150, 160 that both electrically connect to the first end of the single coil 112 of an individual latching relay corresponding to the individual relay driver circuit 132. The first switch 150 is configured to connect a voltage Va of a first polarity to the first end of the individual latching relay coil 112 when a positive voltage is applied to the single input (P1) for the first switch 150. The second switch 160 is configured to establish a ground connection with the first end of the individual latching relay coil 112 when a ground connection is established at the input (P1) to the second switch 160.

Alternatively, a thermostat according to the principles of the present application may have a relay driver circuit 132 for more than one latching relay coil 112, as shown in FIG. 6. In this embodiment, the latching relay circuit has an individual relay driver circuit 132 for each set of paired latching relays connected in parallel. Each individual relay driver circuit 132 has a single input to both a first switch 150 and a second switch 160, which respectively apply a voltage or a ground connection to the first end of each coil 112 of the paired latching relays corresponding to the individual relay driver circuit 132.

In the various embodiments, the latching relay circuit further includes a common relay driver circuit 142. In those embodiments having one relay driver 132 associated with only a single latching relay coil 112 as shown in FIG. 5, the latching relay circuit includes a common relay driver circuit 142 that is connected to each of the latching relay coils 112. The common relay driver circuit 142 has a common input (P5) connected in parallel to first and second switches 150, 160, which both electrically connect to the second end of the single coil 112 in each of the plurality of latching relays. The first switch 150 is configured to connect a voltage of a second polarity to the second ends of the single coils 112 of each of the plurality of latching relays, when a positive voltage is applied (by microprocessor to the common input (P5) leading to the first switch 150. The second switch 160 is configured to establish a ground connection with the second ends of the single coil of each latching relay when a ground connection is established at the common input (P5) leading to the second switch 160.

Alternatively, the thermostat according to the present application may have a common relay driver circuit 142 for more than one latching relay coil 112, such as the paired latching relays shown in FIG. 6. In this embodiment, the latching relay circuit includes a common relay driver circuit 142 for each individual relay of the paired latching relay set, where each individual common relay driver circuit 142 corresponds to an individual latching relay from each paired latching relay set 114. Each individual common relay driver circuit 142 has a single input to both a first switch 150 and a second switch 160. The first switch 150 and second switch 160 respectively apply a voltage or a ground connection to the second end of the single coils 112 of the individual latching relays from each paired set 114 corresponding to the individual common relay driver circuit 142.

In the various embodiments, the thermostat 100 includes a microprocessor 120, which has a plurality of output pins 130 that are connected to the latching relay circuit as shown in FIG. 6. The microprocessor is configured to operate the latching relays, for establishing connection of a power source to one or more loads. In embodiments having a single relay driver circuit 132 associated with a single individual latching relay as shown in FIG. 5, the microprocessor has a common output pin 140 and a plurality of relay driver output pins 130 corresponding to the plurality of relay driver circuits 132. The common output pin 140 is connected to the input of the common relay driver circuit 142) and the relay driver output pin 130 is connected to the input of each relay driver circuit 132.

The microprocessor is configured to momentarily apply a positive voltage to at least one of the plurality of relay driver output pins 130 to cause the first switch 150 of at least one relay driver circuit 132 to connect a voltage of a first polarity to the first end of the single coil 112 of at least one latching relay. Concurrent to the above voltage application, the microprocessor is configured to apply a momentary ground connection to the common output pin 140 to cause the second switch 160 of the common relay driver circuit 142 to establish a ground connection with the second ends of the single coils 112 of each of the plurality of latching relays. Accordingly, the microprocessor thereby momentarily applies a voltage of a first polarity to at least one single coil 112 having a ground connection, to cause the contacts of at least one latching relay to close and remain set in the closed position for establishing an electrical connection to at least one load The microprocessor is further configured to momentarily apply a positive voltage to the common output pin 140, to cause the first switch 150 of the common relay driver circuit 142 to apply a voltage of a second polarity to the second ends of the single coils 112 of each of the plurality of latching relays. Concurrent to the above voltage application, the microprocessor is further configured to apply a momentary ground connection to at least one relay driver output pin 130, to cause the second switch 160 of the at least one relay driver circuit 132 to establish a ground connection with the first end of the single coil 112 of at least one latching relay. Accordingly, the microprocessor thereby momentarily applies a voltage of a second polarity to at least one single coil 112, to cause the contacts of at least one latching relay to open and remain open in a reset position for breaking electrical connection to at least one load.

The microprocessor pins 130 in connection with the relay drivers 132 for switching voltage or ground connections of opposite polarity to a latching relay having a single coil 112 advantageously reduces the number of output pins 130 required of the microprocessor 120. For example, the thermostat having a latching relay circuit embodiment as shown in FIG. 5 is configured such that the contacts of any given latching relay may be set to a closed position by the microprocessor momentarily applying a positive voltage to the relay driver output pin 130 corresponding to the given latching relay, simultaneous to the microprocessor momentarily applying a ground connection to the common output pin 140. The latching relay circuit shown in FIG. 5 is also configured such that the contacts of any given latching relay may be set to an open position by the microprocessor momentarily applying a ground connection to the relay driver output pin 130 corresponding to the given latching relay, simultaneous to the microprocessor 120 momentarily applying a positive voltage to the common output pin 140. The embodiment in FIG. 5 requires the use of only five output pins 130 of the microprocessor 120 to operate four latching relay coils 112. This novel feature is significantly different from the circuit configuration shown in FIG. 2, which requires four microprocessor output pins to drive a single latching relay having a single coil 112

Additionally, the thermostat embodiment shown in FIG. 5 is configured such that the contacts of one or more selected latching relays may be set to a closed position by the microprocessor momentarily applying a positive voltage to the relay driver output pins 130 corresponding to the one or more selected latching relays, simultaneous to the microprocessor momentarily applying a ground connection to the common output pin 140. The contacts of one or more selected latching relays may be set to an open position by the microprocessor momentarily applying a ground connection to the relay driver output pins 130 corresponding to the one or more selected latching relay coils, simultaneous to the microprocessor momentarily applying a positive voltage to the common output pin 140. The above configuration allows for operating "N" number of latching relays using only N+1 microprocessor output pins 130, one pin 130 for each latching relay and one additional output pin 140 for a single common relay driver circuit 142. This novel feature is significantly different from the circuit configuration shown in FIG. 1, which requires four microprocessor output pins to drive a latching relay having a single coil 112.

In embodiments having a relay driver circuit 132 associated with more than one latching relay coil 112 (or paired latching relays 114 as shown in FIG. 6), the microprocessor 120 preferably has a relay driver output pin 130 for each relay driver circuit 132, and a common relay driver output pin 140 for each common relay driver circuit 142. In this embodiment, the microprocessor is configured to momentarily apply a positive voltage to at least one relay driver output pin 130 to cause the first switch 150 of at least one relay driver circuit 132 to apply a voltage of a first polarity to the first ends of the single coils 112 of at least one paired latching relay set 114. Concurrent to the above voltage application, the microprocessor is further configured to momentarily apply a ground connection to at least one common relay driver output pin 140 to cause the second switch 160 of at least one common relay driver circuit 142 to apply a ground connection to the second end of the single coils 112 of the individual latching relays common to the at least one common relay driver circuit 142. Accordingly, the microprocessor thereby momentarily applies a voltage of a first polarity to at least one single coil 112 for causing the contacts of at least one latching relay having a ground connection to close and remain set in the closed position, for establishing an electrical connection to a load. The microprocessor is also configured to momentarily apply a ground connection to at least one relay driver output pin 130 to cause the second switch 160 of at least one relay driver circuit 132 to apply a ground connection to the first ends of the coils 112 of at least one paired latching relay set 114. Concurrent to the above voltage application, the microprocessor 120 is further configured to momentarily apply a positive voltage to at least one common relay driver output pin 140 to cause the first switch 150 of at least one common relay driver circuit 142 to apply a voltage of a second polarity to the second end of the coils 112 of the latching relays common to the at least one common relay driver circuit 142. The microprocessor thereby momentarily applies a voltage of a second polarity to at least one single coil 112 for causing the contacts of at least one latching relay to reset and remain open for breaking an electrical connection to a load.

The configuration shown in FIG. 6 allows the microprocessor to operate a number ("N") of latching relays using fewer than N microprocessor output pins 130, one pin 130 for each latching relay and one additional output pin 140 for each common relay driver circuit 142. This novel feature is significantly different from the circuit configuration shown in FIG. 1, which requires four microprocessor output pins to drive a single latching relay having a single coil 112. In the embodiment of FIG. 6, the contacts of the individual latching relays may be SET closed, or RESET open, by the application of a given voltage to one or more output pins accordingly to the table below.

TABLE 1

Relay Latching Position vs. Pin Output

| | P1 | P2 | P3 | P4 | P5 |
|---|---|---|---|---|---|
| K1-K6 reset open | Low | Low | Low | Hi | Hi |
| K1 set closed (K5, K6 reset open) | Hi | Low | Low | Low | Hi |
| K2 set closed (K4, K6 reset open) | Low | Hi | Low | Low | Hi |
| K3 set closed (K4, K5 reset open) | Low | Low | Hi | Low | Hi |
| K4 set closed (K2, K3 reset open) | Hi | Low | Low | Hi | Low |
| K5 set closed (K1, K3 reset open) | Low | Hi | Low | Hi | Low |
| K6 set closed (K1, K2 reset open) | Low | Low | Hi | Hi | Low |
| K1, K2 set closed (K6 reset open) | Hi | Hi | Low | Low | Hi |
| K1, K3 set closed (K5 reset open) | Hi | Low | Hi | Low | Hi |
| K1, K4 set closed | Hi | Low | Low | Low | Low |
| K2, K3 set closed (K4 reset open) | Low | Hi | Hi | Low | Low |
| K2, K5 set closed | Low | Hi | Low | Low | Low |
| K3, K6 set closed | Low | Low | Hi | Low | Low |
| K4, K5 set closed (K3 reset open) | Hi | Hi | Low | Hi | Low |
| K4, K6 set closed (K2 reset open) | Hi | Low | Hi | Hi | Low |
| K5, K6 set closed (K1 reset open) | Low | Hi | Hi | Hi | Low |
| K1, K2, K3 set closed | Hi | Hi | Hi | Low | Hi |
| K4, K5, K6 set closed | Hi | Hi | Hi | Hi | Low |
| K1, K2, K4, K5 set closed | Hi | Hi | Low | Low | Low |
| K1, K3, K4, K6 set closed | Hi | Low | Hi | Low | Low |
| K2, K3, K5, K6 set closed | Low | Hi | Hi | Low | Low |
| K1-K6 set closed | Hi | Hi | Hi | Low | Low |

In the embodiment shown in FIG. 6, the contacts of the individual latching relays may be RESET or opened by the application of a voltage to one or more output pins accordingly to the above table. The contacts of the individual latching relays may be SET or closed by the application of a voltage to one or more output pins accordingly to the above table. It should be noted that one or more selected relays may be set to a closed position by combinations of the above pin output configurations. To set relays K1, K2, and K6, for example, relays K1-K6 could each be opened using the reset pin configuration (1st line), K1 and K2 could be set closed using an appropriate pin configuration (8th line), and K6 could be set closed using an appropriate pin configuration (7th line). Accordingly, the above configuration allows a microprocessor to operate six latching relays using only 5 microprocessor output pins, one pin for each latching relay and one for each common output pin.

Figure 7:
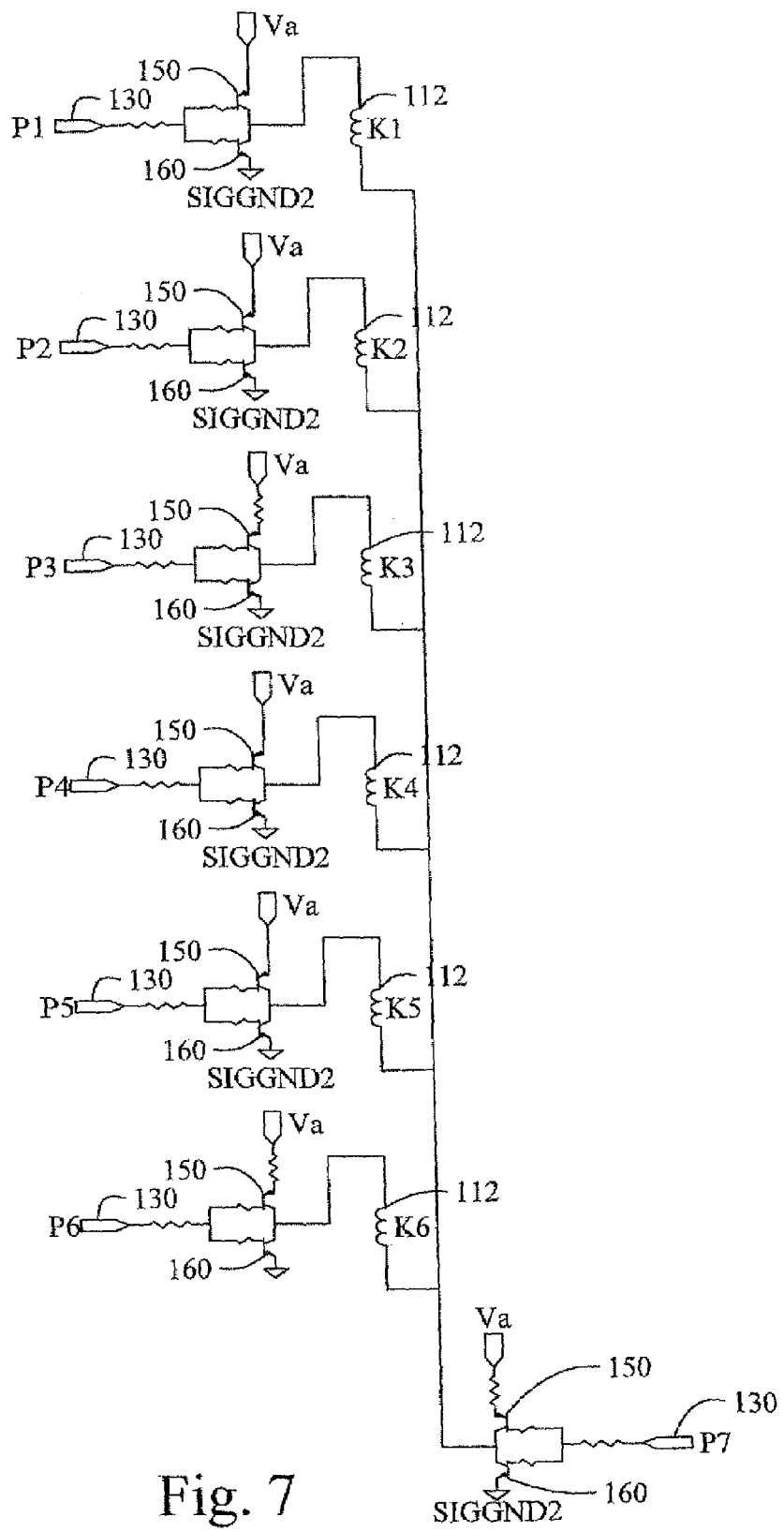
FIG. 7 is a schematic diagram of a fourth embodiment of a control circuit for six single-coil latching relays in accordance with the principles of the present disclosure.

In yet another embodiment (similar to that shown in FIG. 5), a thermostat or apparatus accordingly to the principles of the present application for controlling a latching relay circuit for six latching relays is configured as shown in FIG. 7. The apparatus is configured to switch at least six latching relays, each having a single coil, for controllably switching one or more loads. In the embodiment of FIG. 7, the contacts of the individual latching relays may be SET or closed, or RESET open, by the application of a given voltage to one or more output pins 130 (P1-P6), accordingly to Table 2 below.

TABLE 2

| Relay Latching Position vs. Pin Output | P1 | P2 | P3 | P4 | P5 | P6 | P7 |
|---|---|---|---|---|---|---|---|
| K1-K6 reset open | Low | Low | Low | Low | Low | Low | Hi |
| K1 set closed | Hi | Low | Low | Low | Low | Low | Low |
| K2 set closed | Low | Hi | Low | Low | Low | Low | Low |
| K3 set closed | Low | Low | Hi | Low | Low | Low | Low |
| K4 set closed | Hi | Low | Low | Hi | Low | Low | Low |
| K5 set closed | Low | Hi | Low | Low | Hi | Low | Low |
| K6 set closed | Low | Low | Low | Low | Low | Hi | Low |
| K1, K2 set closed | Hi | Hi | Low | Low | Low | Low | Low |
| K1, K3 set closed | Hi | Low | Hi | Low | Low | Low | Low |
| K1, K4 set closed | Hi | Low | Low | Hi | Low | Low | Low |
| K1, K5 set closed | Hi | Low | Low | Low | Hi | Low | Low |
| K1, K6 set closed | Hi | Low | Low | Low | Low | Hi | Low |
| K2, K3 set closed | Low | Hi | Hi | Low | Low | Low | Low |
| K2, K4 set closed | Low | Hi | Low | Hi | Low | Low | Low |
| K2, K5 set closed | Low | Hi | Low | Low | Hi | Low | Low |
| K2, K6 set closed | Low | Hi | Low | Low | Low | Hi | Low |
| K3, K4 set closed | Low | Low | Hi | Hi | Low | Low | Low |
| K3, K5 set closed | Low | Low | Hi | Low | Hi | Low | Low |
| K3, K6 set closed | Low | Low | Hi | Low | Low | Hi | Low |
| K4, K5 set closed | Low | Low | Low | Hi | Hi | Low | Low |
| K4, K6 set closed | Low | Low | Low | Hi | Low | Hi | Low |
| K5, K6 set closed | Low | Low | Low | Low | Hi | Hi | Low |
| K1, K2, K3 set closed | Hi | Hi | Hi | Low | Low | Low | Low |
| K1, K2, K4 set closed | Hi | Hi | Low | Hi | Low | Low | Low |
| K1, K2, K5 set closed | Hi | Hi | Low | Low | Hi | Low | Low |
| K1, K2, K6 set closed | Hi | Hi | Low | Low | Low | Hi | Low |
| K1, K3, K4 set closed | Hi | Low | Hi | Hi | Low | Low | Low |
| K1, K3, K5 set closed | Hi | Low | Hi | Low | Hi | Low | Low |
| K1, K3, K6 set closed | Hi | Low | Hi | Low | Low | Hi | Low |
| K1, K4, K5 set closed | Hi | Low | Low | Hi | Hi | Low | Low |
| K1, K4, K6 set closed | Hi | Low | Low | Hi | Low | Hi | Low |
| K1, K5, K6 set closed | Hi | Low | Low | Low | Hi | Hi | Low |
| K2, K3, K4 set closed | Low | Hi | Hi | Hi | Low | Low | Low |
| K2, K3, K5 set closed | Low | Hi | Hi | Low | Hi | Low | Low |
| K2, K3, K6 set closed | Low | Hi | Hi | Low | Low | Hi | Low |
| K2, K4, K5 set closed | Low | Hi | Low | Hi | Hi | Low | Low |
| K2, K4, K6 set closed | Low | Hi | Low | Hi | Low | Hi | Low |
| K2, K5, K6 set closed | Low | Hi | Low | Low | Hi | Hi | Low |
| K3, K4, K5 set closed | Low | Low | Hi | Hi | Hi | Low | Low |
| K3, K4, K6 set closed | Low | Low | Hi | Hi | Low | Hi | Low |
| K3, K5, K5 set closed | Low | Low | Hi | Low | Hi | Hi | Low |
| K4, K5, K6 set closed | Low | Low | Low | Hi | Hi | Hi | Low |
| K1, K2, K3, K4 set closed | Hi | Hi | Hi | Hi | Low | Low | Low |
| K1, K2, K3, K5 set closed | Hi | Hi | Hi | Low | Hi | Low | Low |
| K1, K2, K3, K6 set closed | Hi | Hi | Hi | Low | Low | Hi | Low |
| K1, K2, K4, K5 set closed | Hi | Hi | Low | Hi | Hi | Low | Low |
| K1, K2, K4, K6 set closed | Hi | HI | Low | Hi | Low | Hi | Low |
| K1, K2, K5, K6 set closed | Hi | Hi | Low | Low | Hi | Hi | Low |
| K1, K3, K4, K5 set closed | Hi | Low | Hi | Hi | Hi | Low | Low |
| K1, K3, K4, K6 set closed | Hi | Low | Hi | Hi | Low | Hi | Low |
| K1, K3, K5, K6 set closed | Hi | Low | Hi | Low | Hi | Hi | Low |
| K1, K4, K5, K6 set closed | Hi | Low | Low | Hi | Hi | Hi | Low |
| K1, K3, K4, K6 set closed | Low | Low | Low | Low | Low | Low | Low |
| K2, K3, K5, K6 set closed | Low | Hi | Low | Low | Low | Low | Low |
| K1, K2, K4, K5 set closed | Hi | Hi | Low | Low | Low | Low | Low |
| K1, K3, K4, K6 set closed | Hi | Low | Low | Low | Low | Low | Low |
| K2, K3, K4, K5 set closed | Low | Hi | Hi | Hi | Hi | Low | Low |
| K2, K3, K4, K6 set closed | Low | Hi | Hi | Hi | Low | Hi | Low |
| K2, K3, K5, K6 set closed | Low | Hi | Hi | Low | Hi | Hi | Low |
| K2, K4, K5, K6 set closed | Low | Hi | Low | Hi | Hi | Hi | Low |
| K3, K4, K5, K6 set closed | Low | Low | Hi | Hi | Hi | Hi | Low |
| K1, K2, K3, K4, K5 set closed | Hi | Hi | Hi | Hi | Hi | Low | Low |
| K1, K2, K3, K4, K6 set closed | Hi | Hi | Hi | Hi | Low | Hi | Low |
| K1, K2, K3, K5, K6 set closed | Hi | Hi | Hi | Low | Hi | Hi | Low |
| K1, K2, K4, K5, K6 set closed | Hi | Hi | Low | Hi | Hi | Hi | Low |
| K1, K3, K4, K5, K6 set closed | Hi | Low | Hi | Hi | Hi | Hi | Low |
| K2, K3, K4, K5, K6 set closed | Low | Hi | Hi | Hi | Hi | Hi | Low |
| K1, K2, K3, K4, K5, K6 set closed | Hi | Hi | Hi | Hi | Hi | Hi | Low |

The latching relay circuit configuration shown in FIG. 7 allows the microprocessor to operate 6 latching relays using only 7 microprocessor output pins 130, one pin 130 for each latching relay and one additional output pin for a single common relay driver circuit 142. This novel feature is significantly different from the circuit configuration shown in FIG. 1, which requires four microprocessor output pins to drive a single latching relay having a single coil 112.

Figure 8:
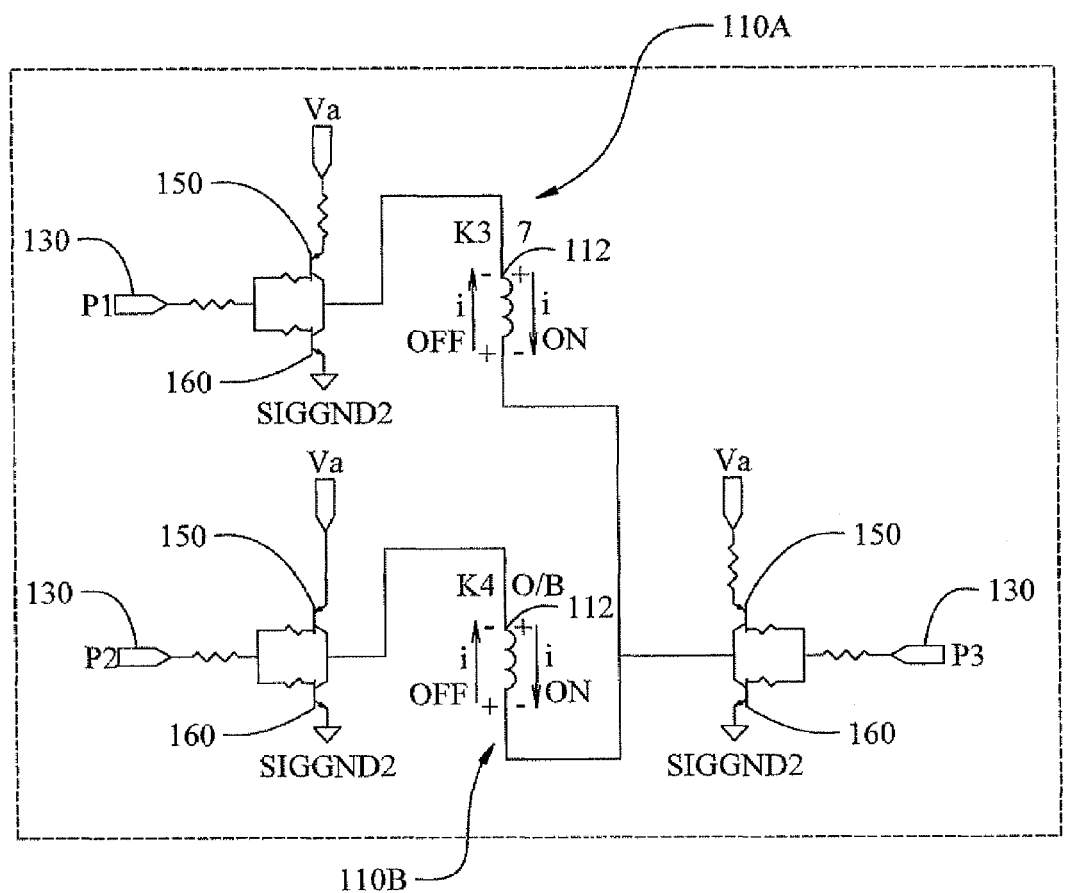
FIG. 8 is a schematic diagram of a fifth embodiment of a control circuit for a plurality of single-coil latching relays in accordance with the principles of the present disclosure.

In yet another embodiment, a thermostat or apparatus accordingly to the principles of the present application in its most basic form is configured as shown in FIG. 8. The apparatus is configured to switch at least two latching relays 110A, 110B for controlling one or more loads. The first latching relay 110A has a single coil 112 configured to open and close a set of contacts (see 110 shown in FIG. 1). A voltage of a first polarity that is momentarily applied to the single coil 112 causes the contacts to close and remain set in the closed position after the voltage pulse is removed from the single coil 112, to establish an electrical connection. A voltage of a second polarity opposite the first polarity, which is momentarily applied to the single coil 112 causes the contacts to open and remain open, to thereby break an electrical connection.

The apparatus includes at least one other latching relay 110B having a single coil 112 configured to open and close a set of contacts, where a voltage of a first polarity that is momentarily applied to the single coil 112 causes the contacts to close and remain set in the closed position after the voltage pulse is removed from the single coil 112, to establish an electrical connection. A voltage of a second polarity opposite the first polarity, which is momentarily applied to the single coil 112 causes the contacts to open and remain open, to thereby break an electrical connection.

The apparatus includes a microprocessor (not shown) having a plurality of output pins 130 configured to operate the latching relays. A common output pin 140 of the microprocessor is connected in parallel to first and second switches 150,160 in electrical connection with the second ends of each latching relay single coil 112. The first switch 150 is configured to connect a voltage source of a second polarity to the second end of each latching relay coil 112 when a positive voltage is applied by the microprocessor via the common output pin 140 to the first switch 150. The second switch 160 is configured to establish a ground connection with the second end of each latching relay coil 112 when a ground connection is established by the microprocessor via the common output pin 140 to the second switch 160.

The microprocessor further includes a first output pin 130 connected in parallel to first and second switches 150, 160 in electrical connection with a first end of the single coil 112 of the first latching relay. The first switch 150 is configured to connect a voltage of a first polarity to the first end of the first latching relay coil 112 when a positive voltage is applied by the microprocessor via the first output pin 130 to the first switch 150. The second switch 160 is configured to establish a ground connection with the first end of the first latching relay coil 112 when a ground connection is established by the microprocessor via the first output pin 130 to the second switch 160.

The microprocessor further includes at least one other output pin 130 connected in parallel to first and second switches 150, 160 in electrical connection with a first end of the single coil 112 of the at least one other latching relay 110B. The first switch 150 is configured to connect a voltage source of a first polarity to the first end of the at least one other latching relay coil 112 when a positive voltage is applied by the microprocessor via the at least one other output pin 134 to the first switch 150. The second switch 160 is configured to establish a ground connection with the first end of the at least one other latching relay coil 112 when a ground connection is established by the microprocessor via the at least one other output pin 130 to the second switch 160.

The microprocessor is configured to momentarily apply a ground connection to the common output pin 140 to establish a ground connection to the second end of each single coil 112, and to concurrently apply a positive voltage to at least one output pin 130 to apply a voltage of a first polarity to the first end of the single coil 112 of at least one latching relay 110A, 110B. Accordingly, the microprocessor thereby momentarily applies a voltage of a first polarity to at least one single coil 112 having a ground connection, for causing the contacts of at least one latching relay 110A, 110B to close and remain set in the closed position, for establishing an electrical connection to a load.

The microprocessor is further configured to momentarily apply a positive voltage to the common output pin 140 to apply a voltage of a second polarity to the second end of each single coil 112, and to concurrently apply a ground connection to at least one output pin 130 to establish a ground connection with the first end of the single coil 112 of at least one latching relay 110A, 110B. The microprocessor thereby momentarily applies a voltage of a second polarity to at least one single coil 112 having a ground connection, for causing the contacts of at least one latching relay to open and remain reset in the open position, for breaking an electrical connection to a load. The above configuration allows the microprocessor to operate a number of latching relays, (2 relays), using only N+1 microprocessor output pins (3 output pins), one pin for each latching relay and one additional output pin for a single common output pin 140. This novel feature is significantly different from the circuit configuration shown in FIG. 1, which requires four microprocessor output pins to drive a single latching relay having a single coil.

It will be understood by those skilled in the art that either the cooling or the heating loads may be employed without implementing the other, particularly if the thermostat is used or designed to control only a cooling load or a heating load. It will be understood that the latching relay control circuits described above may be utilized in other apparatus for controlling HVAC loads, such as a furnace control. Accordingly, it should be understood that the disclosed embodiments of a latching relay control circuitry, and variations thereof, may be employed in any apparatus utilizing one or more latching relays for controlling one or more loads.

What is claimed is:

1. An apparatus comprising:
a plurality of paired latching relays connected in parallel, each latching relay having a single coil configured to open and close a set of contacts, where momentary application of voltage of a first polarity or voltage of a second polarity to the single coil causes the contacts to remain in an open state or a closed state respectively, for breaking or establishing an electrical connection with a load;
an individual relay driver circuit for each set of paired latching relays connected in parallel, each individual relay driver circuit having a single input to both a first switch and a second switch that respectively apply a voltage or a ground connection to the first end of each coil of the paired latching relays corresponding to the individual relay driver circuit;
a common relay driver circuit for each individual relay of the paired latching relay set, where each individual common relay driver circuit corresponds to an individual latching relay from each paired latching relay set, each individual common relay driver circuit having a single input to both a first switch and a second switch that respectively apply a voltage or a ground connection to the second end of the coils of the individual latching relays from each paired set corresponding to the individual common relay driver circuit;
a microprocessor having a relay driver output pin for each relay driver circuit, and a common relay driver output pin for each common relay driver circuit;
wherein the microprocessor is configured to momentarily apply a positive voltage to at least one relay driver output pin to cause the first switch of at least one relay driver circuit to apply a voltage of a first polarity to the first ends of the coils of at least one paired latching relay set, and to momentarily apply a ground connection to at least one common relay driver output pin to cause the second switch of at least one common relay driver circuit to apply a ground connection to the second end of the coils of the individual latching relays common to the at least one common relay driver circuit, to thereby momentarily apply a voltage of a first polarity to at least one single coil for causing the contacts of at least one latching relay to close and remain set in the closed position for establishing an electrical connection to a load; and
wherein the microprocessor is configured to momentarily apply a ground connection to at least one relay driver output pin to cause the second switch of at least one relay driver circuit to apply a ground connection to the first ends of the coils of at least one paired latching relay set, and to momentarily apply a positive voltage to at least one common relay driver output pin to cause the first switch of at least one common relay driver circuit to apply a voltage of a second polarity to the second end of the coils of the latching relays common to the at least one common relay driver circuit, to thereby momentarily apply a voltage of a second polarity to at least one single coil for causing the contacts of at least one latching relay to reset and remain open for breaking an electrical connection to a load.

2. The apparatus of claim 1, wherein the contacts of any given latching relay are set to a closed position by the microprocessor momentarily applying a positive voltage to the relay driver output pin corresponding to the given latching relay, simultaneous to the microprocessor momentarily applying a ground connection to the common output pin corresponding to the given latching relay.

3. The apparatus of claim 1, wherein the contacts of any given latching relay are set to an open position by the microprocessor momentarily applying a ground connection to the relay driver output pin corresponding to the given latching relay, simultaneous to the microprocessor momentarily applying a positive voltage to the common output pin corresponding to the given latching relay.

4. The apparatus of claim 1 wherein the contacts of one or more selected latching relays are set to a closed position by the microprocessor momentarily applying a positive voltage to the relay driver output pins corresponding to the one or more selected latching relays, simultaneous to the microprocessor momentarily applying a ground connection to the common output pin corresponding to the one or more selected latching relays.

5. The apparatus of claim 1, wherein the contacts of one or more selected latching relays are set to an open position by the microprocessor momentarily applying a ground connection to the relay driver output pins corresponding to the one or more selected latching relays, simultaneous to the microprocessor momentarily applying a positive voltage to the common output pin corresponding to the one or more selected latching relays.

6. The apparatus of claim 1, wherein said first and second switches of said relay driver circuits are switch devices selected from the group consisting of a bipolar junction transistor, field effect transistor, a mosfet transistor, a switching diode, an amplifying transistor, a triac, a solid state relay, or combinations thereof.

7. The apparatus of claim 1, further comprising a single fly-back driver output pin of the microprocessor, where a voltage applied by the microprocessor to the output pin causes a switch to establish electrical connection of a single fly-back diode in parallel with the voltage applied to the one or more single coils, to thereby connect one or more single coils to a single fly-back diode.

8. A thermostat configured to switch a power source to one or more heating or cooling loads, the thermostat comprising:

a plurality of latching relays for connecting one or more loads to a power source, each latching relay having a single coil with first and second ends, the single coil being configured to open and close a set of contacts in response to an applied voltage, where a voltage of a first polarity that is momentarily applied to the single coil causes the contacts to close and remain set in the closed position after said voltage is removed to thereby establish an electrical connection to a load, and where a voltage of a second opposite polarity that is momentarily applied to the single coil causes the contacts to open and remain open in a reset position to thereby break an electrical connection to a load;

a plurality of relay driver circuits, each individual relay driver circuit corresponding to an individual latching relay, the individual relay driver circuit having a single input connected in parallel to first and second switches that both electrically connect to the first end of the single coil of an individual latching relay corresponding to the individual relay driver circuit, the first switch being configured to connect a voltage of a first polarity to the first end of the individual latching relay coil when a positive voltage is applied via the input to the first switch, and the second switch being configured to establish a ground connection with the first end of the individual latching relay coil when a ground connection is established via the input to the second switch;

a common relay driver circuit having a common input connected in parallel to first and second switches that both electrically connect to the second end of the single coil in each of the plurality of latching relays, the first switch being configured to connect a voltage of a second polarity to the second ends of the single coils of each of the plurality of latching relays when a positive voltage is applied via the common input to the first switch, and the second switch being configured to establish a ground connection with the second ends of the single coils of each of the plurality of latching relays when a ground connection is established via the common input to the second switch; and a microprocessor having a common output pin and a plurality of relay driver output pins corresponding to the plurality of relay driver circuits, where the common output pin is connected to the input of the common relay driver circuit, and each relay driver output pin is connected to the input of each relay driver circuit;

wherein the microprocessor is configured to momentarily apply a positive voltage to at least one of the plurality of relay driver output pins to cause the first switch of at least one relay driver circuit to connect a voltage of a first polarity to the first end of the single coil of at least one latching relay, and configured to concurrently apply a momentary ground connection to the common output pin to cause the second switch of the common relay driver circuit to establish a ground connection with the second ends of the single coils of each of the plurality of latching relays, to thereby momentarily apply a voltage of a first polarity to at least one single coil for causing the contacts of at least one latching relay to close and remain set in the closed position for establishing an electrical connection to at least one load;

and wherein the microprocessor is further configured to momentarily apply a positive voltage to the common output pin to cause the first switch of the common relay driver to apply a voltage of a second polarity to the second ends of the single coils of each of the plurality of latching relays, and further configured to concurrently apply a momentary ground connection to at least one relay driver output pin to cause the second switch of the at least one relay driver circuit to establish a ground connection with the first end of the single coil of at least one latching relay, to thereby momentarily apply a voltage of a second polarity to at least one single coil for causing the contacts of at least one latching relay to open and remain open in a reset position for breaking electrical connection to at least one load.

9. The apparatus of claim 8, wherein the contacts of any given latching relay are set to a closed position by the microprocessor momentarily applying a positive voltage to the relay driver output pin corresponding to the given latching relay, simultaneous to the microprocessor momentarily applying a ground connection to the common output pin.

10. The apparatus of claim 8, wherein the contacts of any given latching relay are set to an open position by the microprocessor momentarily applying a ground connection to the relay driver output pin corresponding to the given latching relay, simultaneous to the microprocessor momentarily applying a positive voltage to the common output pin.

11. The apparatus of claim 8 wherein the contacts of one or more selected latching relays are set to a closed position by the microprocessor momentarily applying a positive voltage to the relay driver output pins corresponding to the one or more selected latching relays, simultaneous to the microprocessor momentarily applying a ground connection to the common output pin.

12. The apparatus of claim 8, wherein the contacts of one or more selected latching relays are set to an open position by the microprocessor momentarily applying a ground connection to the relay driver output pins corresponding to the one or more selected latching relays, simultaneous to the microprocessor momentarily applying a positive voltage to the common output pin.

13. The apparatus of claim 8, wherein said first and second switches of said relay driver circuits are switch devices selected from the group consisting of a bipolar junction transistor, field effect transistor, a mosfet transistor, a switching diode, an amplifying transistor, a triac, a solid state relay, or combinations thereof.

14. The apparatus of claim 8, further comprising a single fly-back driver output pin of the microprocessor, where a voltage applied by the microprocessor to the output pin causes a switch to establish electrical connection of a single fly-back diode in parallel with the voltage applied to the one or more single coils, to thereby connect one or more single coils to a single fly-back diode.

15. A thermostat configured to switch a power source to one or more heating or cooling loads, the thermostat comprising:
   a plurality of latching relay sets, each latching relay set having a plurality of parallel latching relays for connecting one or more loads to a power source, each latching relay having a single coil with first and second ends, the single coil being configured to open and close a set of contacts in response to an applied voltage, where a voltage of a first polarity that is momentarily applied to the single coil causes the contacts to close and remain set in the closed position after said voltage is removed, to thereby establish an electrical connection to a load, and where a voltage of a second opposite polarity that is momentarily applied to the single coil causes the contacts to open and remain open in a reset position to thereby break an electrical connection to a load;
   a plurality of relay driver circuits, each individual relay driver circuit corresponding to an individual latching relay, the relay driver circuit having a single input connected in parallel to first and second switches that both connect to the first end of the single coil of each individual latching relay in the set corresponding to the individual relay driver circuit, the first switch being configured to connect a voltage source of a first polarity to the first end of the single coil of each individual latching relay in the set when a positive voltage is applied via the input to the first switch, and the second switch being configured to establish a ground connection with the first end of the single coil of each individual latching relay in the set when a ground connection is established via the input to the second switch;
   a number of common relay driver circuits proportional to the number of latching relays in each latching relay set, where each individual common relay driver circuit corresponds to an individual latching relay from each of the sets, the individual common relay driver circuit having a common input connected in parallel to first and second switches that both electrically connect to the second ends of the single coils of individual latching relays in common with the individual common relay driver circuit, the first switch being configured to connect a voltage source of a second polarity to the second ends of the single coils of the common latching relays when a positive voltage is applied via the common input to the first switch, and the second switch being configured to establish a ground connection with the second ends of the single coils of the common individual latching relays when a ground connection is established via the common input to the second switch; and
   a microprocessor having a number of common output pins corresponding to the number of common relay driver circuits, and a plurality of relay driver output pins corresponding to the plurality of relay driver circuits, where the common output pin is connected to the input of a corresponding common relay driver circuit, where each individual common output pin is connected to a corresponding common relay driver circuit, and each relay driver output pin is connected to the input of each relay driver circuit,
   wherein the microprocessor is configured to momentarily apply a positive voltage to at least one of the plurality of relay driver output pins to cause the first switch of the at least one relay driver circuit to connect a voltage of a first polarity to the first end of the single coil of each latching relay in the set corresponding to the at least one relay driver circuit, and is configured to concurrently apply a momentary ground connection to at least one common output pin to cause the second switch of at least one common relay driver circuit to establish a ground connection with the second ends of the single coils of the individual latching relays in common with the at least one common relay driver circuit, to thereby momentarily apply a voltage of a first polarity to at least one single coil for causing the contacts of at least one latching relay to close and remain set in the closed position for establishing an electrical connection to at least one load;
   and wherein the microprocessor is further configured to momentarily apply a positive voltage to at least one of the common output pins to cause the first switch of the common relay driver circuit to connect a voltage of a second polarity to the second ends of the single coils of the individual latching relays in common with the at least one common relay driver circuit, and to concurrently apply a momentary ground connection to at least one relay driver output pin to cause the second switch of the at least one relay driver circuit to establish a ground connection with the first ends of the single coils of each latching relay in the set corresponding to the at least one relay driver circuit, to thereby momentarily apply a voltage of a second polarity to at least one single coil for causing the contacts of at least one latching relay to open and remain open in a reset position for breaking electrical connection to at least one load.

16. The apparatus of claim 15, wherein the contacts of any given latching relay are set to a closed position by the microprocessor momentarily applying a positive voltage to the relay driver output pin corresponding to the given latching relay, simultaneous to the microprocessor momentarily applying a ground connection to the common output pin corresponding to the given latching relay.

17. The apparatus of claim 15, wherein the contacts of any given latching relay are set to an open position by the microprocessor momentarily applying a ground connection to the relay driver output pin corresponding to the given latching relay, simultaneous to the microprocessor momentarily applying a positive voltage to the common output pin corresponding to the given latching relay.

18. The apparatus of claim 15, wherein said first and second switches of said relay driver circuits are switch devices selected from the group consisting of a bipolar junction transistor, field effect transistor, a mosfet transistor, a switching diode, an amplifying transistor, a triac, a solid state relay, or combinations thereof.

19. The apparatus of claim 15, further comprising a single fly-back driver output pin of the microprocessor, where a voltage applied by the microprocessor to the output pin causes a switch to establish electrical connection of a single fly-back diode in parallel with the voltage applied to the one or more single coils, to thereby connect one or more single coils to a single fly-back diode.

20. An apparatus comprising:
- a first latching relay having a single coil configured to open and close a set of contacts, where a voltage of a first polarity that is momentarily applied to the single coil causes the contacts to close and remain set in the closed position after said voltage is removed from the single coil, to establish an electrical connection, and where a voltage of a second polarity opposite the first polarity momentarily applied to the single coil causes the contacts to open and remain open to thereby break an electrical connection;
- at least one other latching relay having a single coil configured to open and close a set of contacts, where a voltage of a first polarity that is momentarily applied to the single coil causes the contacts to close and remain set in the closed position after said voltage is removed from the single coil, to establish an electrical connection, and where a voltage of a second polarity opposite the first polarity momentarily applied to the single coil causes the contacts to open and remain open to thereby break an electrical connection;
- a microprocessor having a plurality of output pins configured to operate the latching relays;
- a common output pin of the microprocessor connected in parallel to first and second switches in electrical connection with the second ends of each latching relay single coil, the first switch being configured to connect a voltage source of a second polarity to the second end of each latching relay coil when a positive voltage is applied via the common output pin to the first switch, and the second switch being configured to establish a ground connection with the second end of each latching relay coil when a ground connection is established via the common output pin to the second switch;
- a first output pin of the microprocessor connected in parallel to first and second switches in electrical connection with a first end of the single coil of the first latching relay, the first switch being configured to connect a voltage of a first polarity to the first end of the first latching relay coil when a positive voltage is applied via the first output pin to the first switch, and the second switch being configured to establish a ground connection with the first end of the first latching relay coil when a ground connection is established via the first output pin to the second switch; and
- at least one other output pin of the microprocessor connected in parallel to first and second switches in electrical connection with a first end of the single coil of the at least one other latching relay, the first switch being configured to connect a voltage source of a first polarity to the first end of the at least one other latching relay coil when a positive voltage is applied via the at least one other output pin to the first switch, and the second switch being configured to establish a ground connection with the first end of the at least one other latching relay coil when a ground connection is established via the at least one other output pin to the second switch;
- wherein the microprocessor is configured to momentarily apply a ground connection to the common output pin to establish a ground connection to the second end of each single coil, and to concurrently apply a positive voltage to at least one output pin to apply a voltage of a first polarity to the first end of the single coil of at least one latching relay, to thereby momentarily apply a voltage of a first polarity to at least one single coil for causing the contacts of at least one latching relay to close and remain set in the closed position for establishing an electrical connection to a load; and
- wherein the microprocessor is further configured to momentarily apply a positive voltage to the common output pin to apply a voltage of a second polarity to the second end of each single coil, and to concurrently apply a ground connection to at least one output pin to establish a ground connection with the first end of the single coil of at least one latching relay, to thereby momentarily apply a voltage of a second polarity to at least one single coil for causing the contacts of at least one latching relay to open and remain reset in the open position for breaking an electrical connection to a load.

* * * * *